United States Patent
Shahane et al.

(10) Patent No.: US 11,231,955 B1
(45) Date of Patent: Jan. 25, 2022

(54) DYNAMICALLY REALLOCATING MEMORY IN AN ON-DEMAND CODE EXECUTION SYSTEM

(71) Applicant: Amazon Technologies, Inc., Seattle, WA (US)

(72) Inventors: Vishal Shahane, Bothell, WA (US); Marc Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 16/808,237

(22) Filed: Mar. 3, 2020

(51) Int. Cl.
*G06F 9/455* (2018.01)
*G06F 9/445* (2018.01)
*G06F 9/50* (2006.01)

(52) U.S. Cl.
CPC ...... *G06F 9/45558* (2013.01); *G06F 9/44505* (2013.01); *G06F 9/5016* (2013.01); *G06F 9/5022* (2013.01); *G06F 2009/45583* (2013.01); *G06F 2209/5011* (2013.01)

(58) Field of Classification Search
CPC ............ G06F 9/45558; G06F 9/44505; G06F 9/5016; G06F 9/5022; G06F 2009/45583; G06F 2209/5011
See application file for complete search history.

(56) References Cited

U.S. PATENT DOCUMENTS

| 2014/0137110 | A1* | 5/2014 | Engle | G06F 9/505 718/1 |
| 2014/0331222 | A1* | 11/2014 | Zheng | G06F 9/5077 718/1 |
| 2018/0004572 | A1* | 1/2018 | Wagner | H04L 67/303 |
| 2020/0401455 | A1* | 12/2020 | Church, IV | G06F 3/0665 |

* cited by examiner

*Primary Examiner* — Diem K Cao
(74) *Attorney, Agent, or Firm* — Knobbe Martens Olson & Bear LLP

(57) ABSTRACT

Systems and methods are described for dynamically adjusting quantities of computing resources allocated to virtual machine instances in an on-demand code execution system. An on-demand code execution system may execute user-submitted code on virtual machine instances, which may be provisioned with quantities of various computing resources (memory, storage, processor time, etc.). Users may request that code be executed on virtual machine instances having a particular quantity of a particular computing resource, and a previously provisioned virtual machine instance have a different quantity of the resource than the quantity requested. A resource reclamation system may thus be used to dynamically adjust the quantity of computing resources without reprovisioning the virtual machine instance. The resource reclamation system may execute a resource reclamation process within the virtual machine instance, which may claim or release a portion of the provisioned computing resource to cause the virtual machine instance to have the requested quantity.

20 Claims, 12 Drawing Sheets

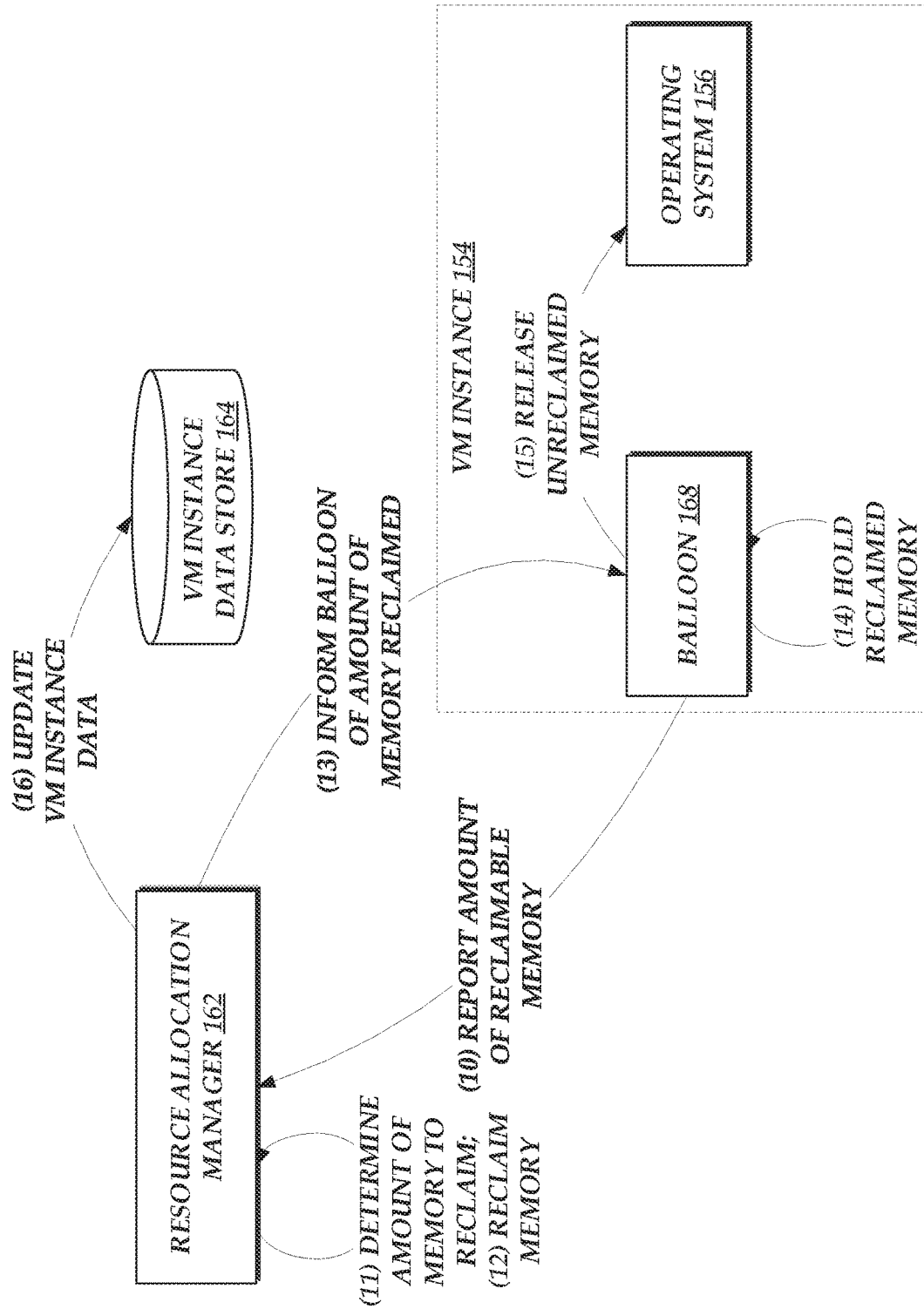

DYNAMICALLY REALLOCATING MEMORY IN AN ON-DEMAND CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 3A and 3B are flow diagrams depicting illustrative interactions for reclaiming computing resources from virtual machine instances in accordance with aspects of the present disclosure.

DETAILED DESCRIPTION

Figure 1A:
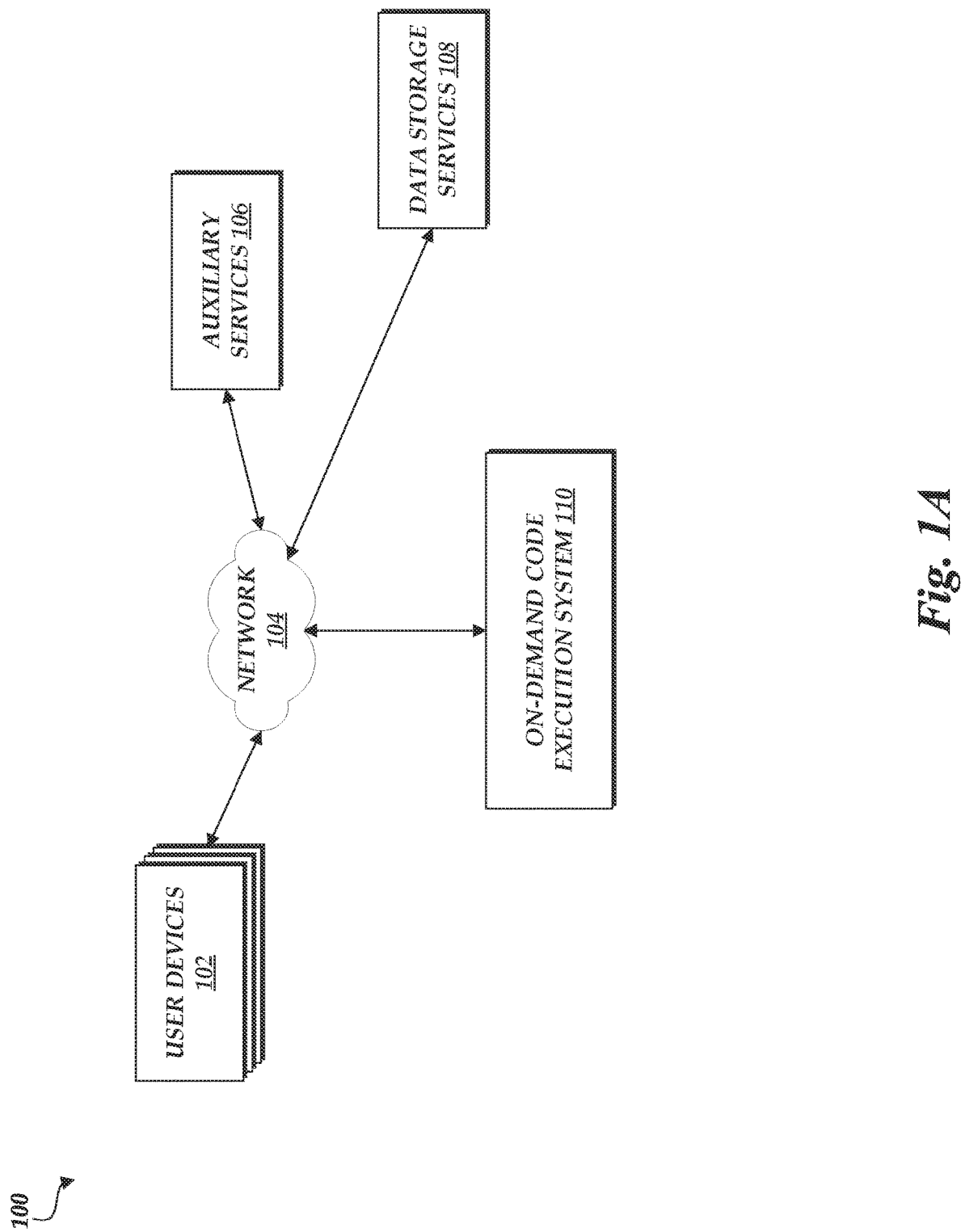
FIGS. 1A and 1B are block diagrams depicting an illustrative environment in which an on-demand code execution system can execute tasks corresponding to code, which may be submitted by users of the on-demand code execution system, and can reclaim computing resources used to execute the tasks in accordance with aspects of the present disclosure.

Generally described, aspects of the present disclosure relate to an on-demand code execution system. The on-demand code execution system enables rapid execution of code, which may be supplied by users of the on-demand code execution system. More specifically, aspects of the present disclosure relate to improving the performance of an on-demand code execution system by implementing a reclaimable resource system, which may reclaim idle or unused computing resources associated with on-demand execution of computer-executable code.

As described in detail herein, an on-demand code execution system may provide a network-accessible service enabling users to submit or designate computer-executable code to be executed by virtual machine instances on the on-demand code execution system. Each set of code on the on-demand code execution system may define a "task," and may implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds), thus enabling execution of tasks in "real-time" (e.g., with little or no perceptible delay to an end user).

The on-demand code-execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

As described in more detail below, the on-demand code execution system may include a worker manager configured to receive user code (threads, programs, etc., composed in any of a variety of programming languages) and execute the code in a highly scalable, low latency manner, without requiring user configuration of a virtual machine instance. Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a preconfigured virtual machine instance to execute the code based on configuration information associated with the request. The worker manager can further allocate the identified virtual machine instance to execute the user's code at least partly by creating and configuring containers inside the allocated virtual machine instance, and provisioning the containers with code of the task as well as a dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine instance executing an operating system is described herein as one example of an execution environment, other execution environments are also possible. For example, tasks or other processes may be executed within a software "container," which provides an isolated runtime environment without itself providing virtualization of hardware. Containers may be implemented within virtual machines to provide additional security, or may be run outside of a virtual machine instance.

The on-demand code execution system may therefore include a number of host computing devices, which host virtual machine instances executing tasks on behalf of users. These virtual machine instances may be provisioned with various computing resources, such as computer memory, processors, processing time, data stores, network bandwidth, and the like. These computing resources are typically allocated to the virtual machine instance when it is created, and are then utilized to execute the tasks. However, a task may only utilize a portion of the computing resources allocated to the virtual machine instance it is executed upon, or may utilize a computing resource for some length of time and then cease to do so. For example, a virtual machine instance may cease or reduce its utilization of memory because it has completed execution of a user-submitted task. As a further example, a virtual machine instance may execute a user-submitted task having a first phase that consumes a significant amount of network bandwidth, followed by a second phase that consumes little to no bandwidth and instead consumes significant amounts of memory and processing time. The computing resources allocated to a virtual machine instance may thus be underutilized.

Additionally, in some embodiments, a host computing device may provision and allocate computing resources to virtual machine instances prior to receiving requests to execute tasks. Illustratively, provisioning and configuring a virtual machine instance may take time, and the on-demand code execution system may thus pre-provision virtual machine instances to avoid delaying execution of a user-submitted task. However, allocating resources to a virtual machine instance before knowing what computing resources are needed for a particular task may require the host computing device to err on the side of providing too many resources, which may lead to inefficiency. In some embodiments, the host computing device may provision a pool of virtual machine instances with various resource allocations, and then determine a "best fit" between an incoming request to execute a task and the available virtual machine instances. However, it may be difficult to predict the right mix of virtual machine instance capacities, and an incorrect prediction may lead to a pool stocked with virtual machine instances that are "too big" (e.g., instances that have more computing resources than are needed for most of the incoming tasks) or "too small" (e.g., instances that are underused because they do not have sufficient computing resources to execute most of the incoming tasks).

A host computing device may thus allocate computing resources to virtual machine instances, and these computing resources may become idle or underutilized (e.g., because the virtual machine instance does not need them, or because the virtual machine instance itself is idle or underutilized). However, in some embodiments, the host computing device may lack visibility into whether a virtual machine instance is efficiently using the computing resources allocated to it, or whether these computing resources could be reclaimed and reallocated to another virtual machine instance without significantly disrupting execution of a user-submitted task. The host computing device may therefore allocate computing resources to virtual machine instances inefficiently, and as a result the host computing device may not be able to execute as many user-submitted tasks as it otherwise could. In other embodiments, the host computing device may have the capability to determine whether a virtual machine instance is using its allocated computing resources efficiently, but using this capability may significantly increase the overhead consumption of computing resources on the host computing device, and thereby reduce the amount of computing resources that the host computing device can make available to virtual machine instances.

In some embodiments, it may be desirable to change the allocation of computing resources to an existing virtual machine instance. For example, a user of the on-demand code execution system may request an increase or decrease to the computing resources allocated to a virtual machine instance that is executing the user's task. As a further example, the on-demand code execution system may determine that a particular virtual machine instance is under- or over-resourced relative to the tasks it will be executing. However, it may be difficult or inefficient to modify an existing virtual machine instance without interrupting its availability or disrupting the execution of tasks. For example, an operating system on the virtual machine instance may require reconfiguration in order to process a change in allocated resources (e.g., to recognize an increase or reduction in available memory).

To address these issues, an operator of an on-demand code execution system may implement a reclaimable resource system as described herein. The reclaimable resource system may, in some embodiments, implement reclaimable resource identification as a process within a virtual machine instance, and may prioritize reclamation of computing resources based on the measured or predicted workloads of virtual machine instances executing user-submitted tasks. The reclaimable resource identification system may also prioritize and schedule reclamation of computing resources based on resource demand, such that reclamation tasks are scheduled when computing resources are available to execute them, or when measured or predicted demand for computing resources indicates a potential resource bottleneck (e.g., that the host computing device is running low on free memory, and soon will be unable to provision more virtual machine instances). In other embodiments, the reclaimable resource system may enable more efficient configuration and reconfiguration of virtual machine instances on demand.

While a number embodiments described herein include a "balloon" process that identifies reclaimable memory by "inflating" and "deflating," it will be understood that the present disclosure is not limited to a particular process for identifying reclaimable computing resources or to identifying a particular computing resource as reclaimable. For example, embodiments of the present disclosure include identifying reclaimable computing resources such as processors, processing time, data stores, network bandwidth, and the like. As a further example, embodiments of the present disclosure include identifying reclaimable computing resources based on utilization of the computing resources, utilization of other computing resources (e.g., utilization of backing stores), predicted demand, or other criteria.

As will be appreciated by one of skill in the art in light of the present disclosure, the embodiments disclosed herein improve the ability of computing systems, such as on-demand code execution systems, to execute code in an efficient manner. Moreover, the presently disclosed embodiments address technical problems inherent within computing systems; specifically, the problem of efficiently allocating computing resources to virtual machine instances that execute tasks on demand in an on-demand code execution system. These technical problems are addressed by the various technical solutions described herein, including the implementation of a reclaimable resource system within an on-demand code execution system to improve the performance and capacity of the on-demand code execution system. Thus, the present disclosure represents an improvement on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain embodiments. Furthermore, various embodiments may include several novel features, no single one of which is solely responsible for its desirable attributes or which is essential to practicing the embodiments herein described.

FIG. 1A is a block diagram of an illustrative operating environment 100 in which an on-demand code execution system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the on-demand code execution system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In the example of FIG. 1A, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the operating environment 100. In one example, only the frontend 120 depicted in FIG. 1B (which may in some instances represent multiple frontends 120) may be connected to the network 104, and other components of the on-demand code execution system 110 may communicate with other components of the environment 100 via the frontends 120.

In FIG. 1A, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

Figure 1B:
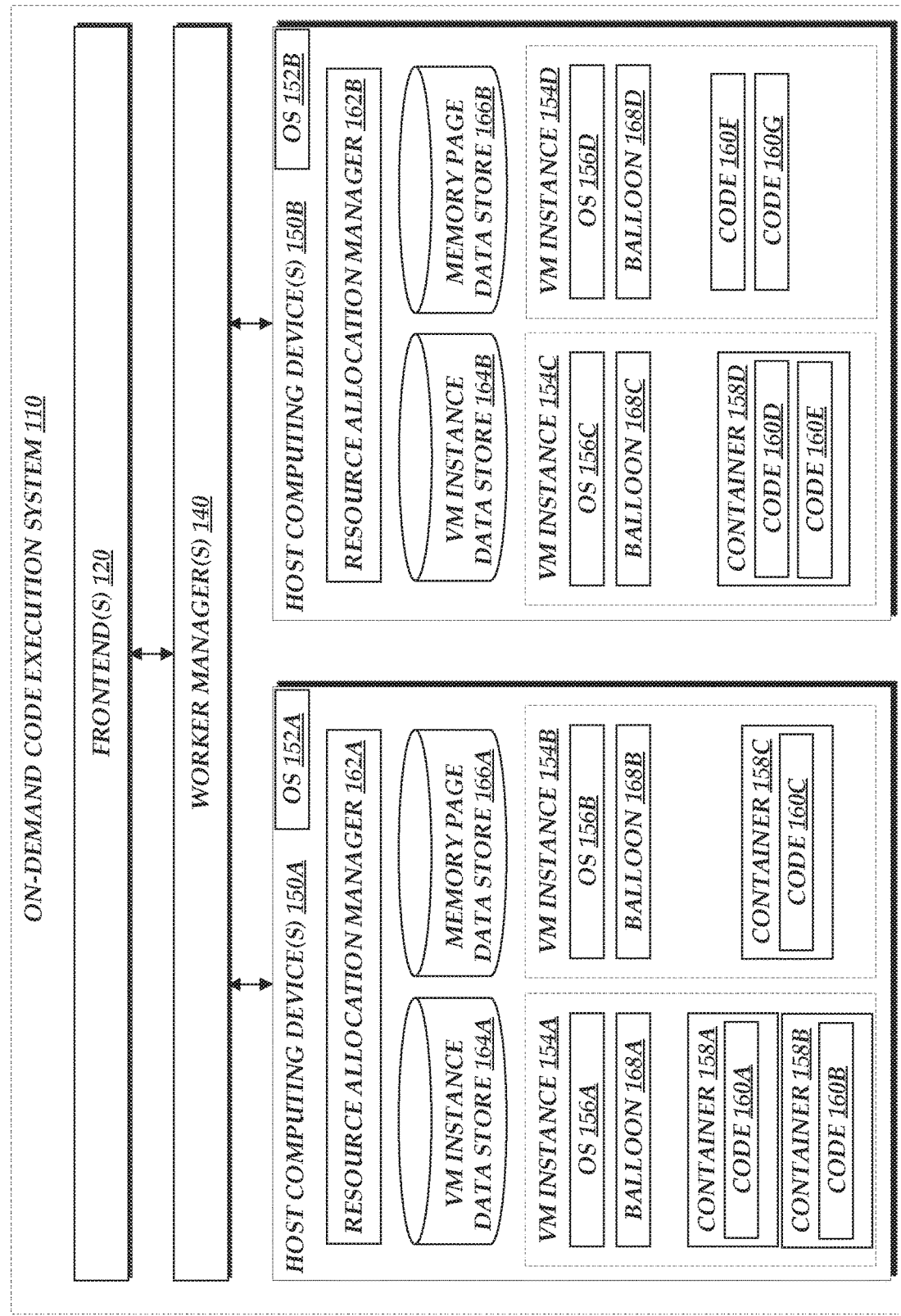

With reference now to FIG. 1B, the on-demand code execution system 110 is depicted as operating in a distributed computing environment including several computer systems that are interconnected using one or more computer networks (not shown in FIG. 1B). The on-demand code execution system 110 could also operate within a computing environment having a fewer or greater number of devices than are illustrated in FIG. 1B. Thus, the depiction of the on-demand code execution system 110 in FIG. 1B should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of executing computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1B), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1B), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1B) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1B) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more worker managers 140 that manage the instances used for servicing incoming calls to execute tasks. In the example illustrated in FIG. 1B, each worker manager 140 manages an active pool of virtual machine instances 154A-D, which are currently assigned to one or more users and are implemented by one or more physical host computing devices 150A-B. The physical host computing devices 150A-B and the virtual machine instances 154A-D may further implement one or more containers 158A-D, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-D and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container. In some embodiments, the virtual machine instances 154A-D may execute one or more user-submitted codes, such as user-submitted codes 160F-G, without implementing a container.

The containers 158A-D, virtual machine instances 154A-D, and host computing devices 150A-B may further include language runtimes, code libraries, or other supporting functions (not depicted in FIG. 1) that facilitate execution of user-submitted code 160A-G. The physical computing devices 150A-B and the virtual machine instances 154A-D may further include operating systems 152A-B and 156A-D. In various embodiments, operating systems 152A-B and 156A-D may be the same operating system, variants of the same operating system, different operating systems, or combinations thereof.

Although the virtual machine instances 154A-D are described here as being assigned to a particular user, in some embodiments, an instance 154A-D may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of host computing devices 150A-B, virtual machine instances 154A-D, and containers 158A-D may be used to facilitate execution of user submitted code 160A-G. In the illustrated example, the host computing device 150A implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. The host computing device 150B further implements two virtual machine instances 154C and 154D; the virtual machine instance 154C implements container 158D, which contains user-submitted codes 160D and 160E, and the virtual machine instance 154D directly contains user-submitted codes 160F and 160G. It will be understood that these embodiments are illustrated for purposes of example, and that many other embodiments are within the scope of the present disclosure.

In the illustrated embodiment, the host computing devices 150A and 150B include a resource allocation manager 162A and 162B respectively. Illustratively, the resource allocation managers 162A and 162B may manage the allocation and reallocation of computing resources to the virtual machine instances 154A-D, and may communicate with reclaimable resource identification processes 168A-D. In some embodiments, the reclaimable resource identification processes 168A-D may be described herein as "balloon processes" or "balloons," and their functionality may be described in terms of "inflating" or "deflating," as described in more detail below with reference to FIGS. 2A-2D. The host computing devices 150A and 150B further respectively include a virtual machine instance data store 164A and 164B, and a memory page data store 166A and 166B. The data stores 164A, 164B, 166A, and 166B may generally be any non-transitory computer-readable data store, including but not limited to hard drives, solid state devices, magnetic media, flash memory, and the like. In some embodiments, the data stores 164A, 164B, 166A, and 166B may be implemented as databases, web services, or cloud computing services. Illustratively, the virtual machine instance data stores 164A and 164B may store information regarding virtual machine instances that have been provisioned on the host computing devices 150A and 150B, and the memory page data stores 166A and 166B may provide backing for memory pages assigned to the virtual machine instances 154A-D.

While some functionalities are generally described herein with reference to an individual component of the on-demand code execution system 110, other components or a combination of components may additionally or alternatively implement such functionalities. For example, a worker manager 140 may operate to provide functionality associated with execution of user-submitted code as described herein with reference to the resource allocation managers 162A and 162B.

FIGS. 2A, 2B, 2C, and 2D depict a general architecture of a computing system (referenced as host computing device 150) that operates to execute user-submitted tasks within the on-demand code execution system 110 and to implement a reclaimable resource system in accordance with aspects of the present disclosure. The general architecture of the host computing device 150 depicted in FIGS. 2A, 2B, 2C, and 2D includes an arrangement of computer hardware and software modules that may be used to implement aspects of the present disclosure. The hardware modules may be implemented with physical electronic devices, as discussed in greater detail below. The host computing device 150 may include many more (or fewer) elements than those shown in FIGS. 2A, 2B, 2C, and 2D. It is not necessary, however, that all of these generally conventional elements be shown in order to provide an enabling disclosure. Additionally, the general architecture illustrated in FIGS. 2A, 2B, 2C, and 2D may be used to implement one or more of the other components illustrated in FIGS. 1A-B.

Figure 2A:
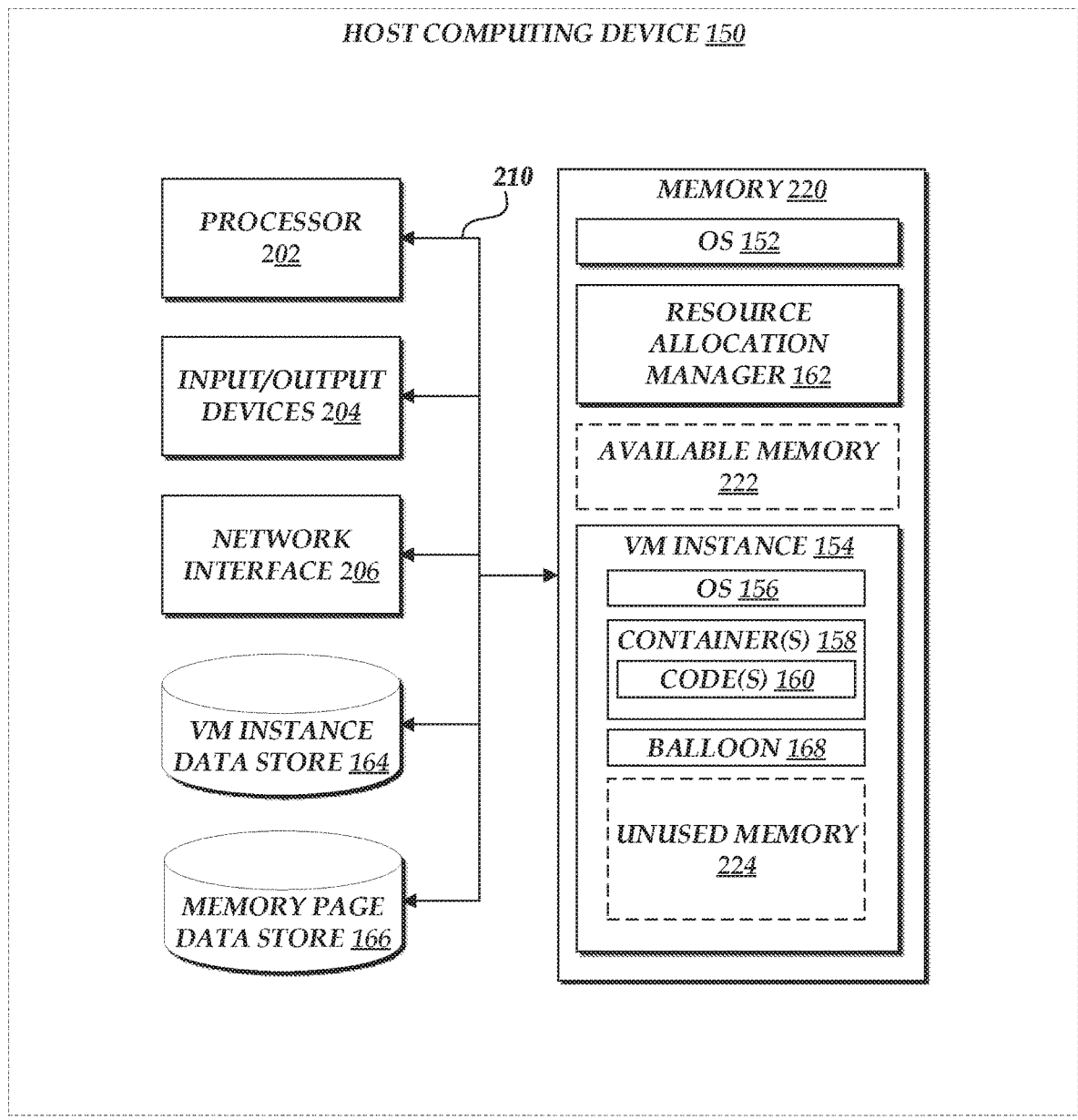
FIGS. 2A, 2B, 2C, and 2D depict a general architecture of a host computing device that is used by an on-demand code execution system to execute tasks on demand, and depict provisioning and reclaiming computing resources from the virtual machine instances in accordance with aspects of the present disclosure.

With reference now to FIG. 2A, the host computing device 150 includes a processor 202, input/output device interfaces 204, a network interface 206, the virtual machine instance data store 164, and the memory page data store 166, all of which may communicate with one another by way of a communication bus 210. The network interface 206 may provide connectivity to one or more networks or computing systems. The processor 202 may thus receive information and instructions from other computing systems or services via the network 104. The processor 202 may also communicate to and from a memory 220 and further provide output information for an optional display (not shown) via the input/output device interfaces 204. The input/output device interfaces 204 may also accept input from an optional input device (not shown). The virtual machine instance data store 164 and the memory page data store 166 may generally be any non-transitory computer-readable data stores, including but not limited to hard drives, solid state devices, magnetic media, flash memory, and the like. In some embodiments, the virtual machine instance data store 164 and the memory page data store 166 may be implemented as databases, web services, or cloud computing services, and may be external to the host computing device 150 (e.g., the data storage services 108 depicted in FIG. 1A). Additionally, in various embodiments, the virtual machine instance data store 164 and the memory page data store 166 may be implemented as a single data store or distributed across multiple data stores.

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 152 that provides computer program instructions for use by the processor 202 in the general administration and operation of the host computing device 150. The memory 220 may further include computer program instructions and other information for implementing aspects of the present disclosure. For example, in one embodiment, the memory 220 includes an interface module (not shown) that generates interfaces (and/or instructions therefor) for interacting with the frontends 120, worker managers 140, or other computing devices, e.g., via an API, CLI, and/or Web interface. In addition, the memory 220 may include and/or communicate with one or more data repositories (not shown), for example, to access user program codes and/or libraries.

In the illustrated embodiment, the memory 220 includes available memory 222, which is a portion of the memory 220 that is available to be allocated to new or existing processes on the host computing device. The size of the available memory 222 may increase or decrease as the resource allocation manager 162 allocates (or reallocates) resources to virtual machine instances 154, which may be created as environments for executing user-submitted tasks. In the illustrated embodiment, a single virtual machine instance 154 is depicted. However, it will be understood that any number of virtual machine instances 154 may be created provided that sufficient amounts of available memory 222 and other computing resources are available. Each virtual machine instance 154 may include an operating system 156, which in various embodiments may be the same operating system as the operating system 152 used by the host computing device 150, a different version of the same operating system 152, or an entirely different operating system. Each virtual machine instance 154 may further include one or more containers 158, which may each contain one or more user-submitted codes 160 to be executed on behalf of a user of the on-demand code execution system 110.

In some embodiments, a virtual machine instance 154 may further include a reclaimable memory identification process or "balloon" process 168, whose operation is described in more detail below. The virtual machine instance 154 may also include unused memory 224, all or part of which may be identified as reclaimable memory and reclaimed as described below. In various embodiments, unused memory 224 may include memory allocated to the virtual machine instance 154 that has not been used, was not accessed for a threshold amount of time, was used and then released, or is in other reclaimable states. In some embodiments, all or some of the functionality of the balloon process 168 may be implemented by the resource allocation manager 162, the operating systems 152 and 156, or another process.

In some embodiments, the host computing device 150 may further include components other than those illustrated in FIG. 2A. For example, the memory 220 may further include information regarding pending requests to execute user-submitted tasks, timing information regarding previously executed tasks, or other information that facilitates reclaiming computing resources. FIG. 2A is thus understood to be illustrative but not limiting.

Figure 2B:
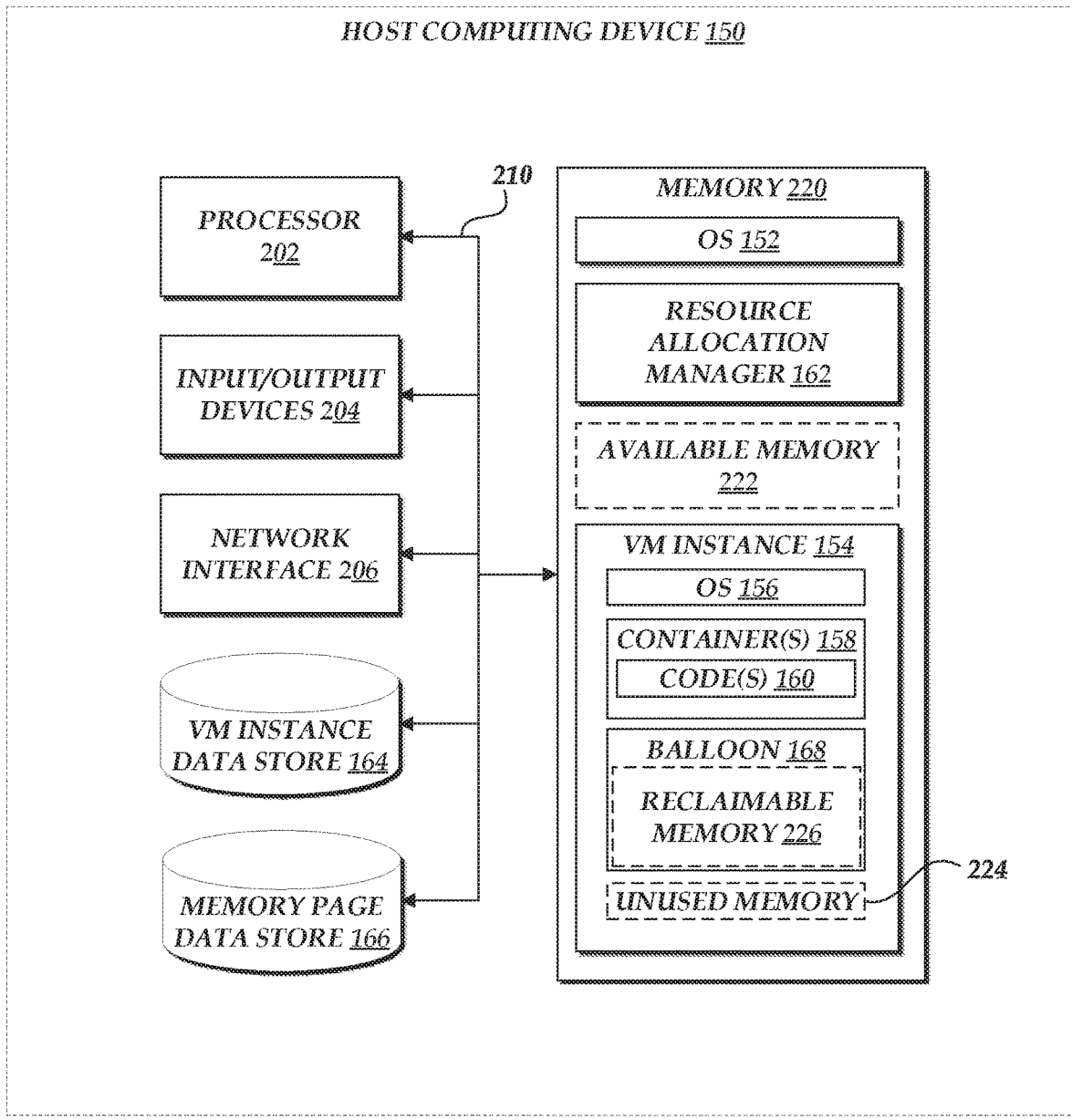

FIG. 2B depicts the general architecture of the host computing device 150 after the balloon process 168 has "inflated" by requesting that the operating system 156 (or, in some embodiments, another process) allocate at least a portion of the unused memory 224 to the balloon process 168. Unless described otherwise, components illustrated in FIG. 2B are identical to those illustrated in FIG. 2A. In various embodiments, as described in more detail below, the balloon process 168 may continue to inflate until it has obtained all of the unused memory 224, or may identify and designate a portion of the unused memory 224 as a buffer to allow for potential memory requests generated during execution of user-submitted code(s) 160. In other embodiments, the balloon process 168 may interact with the operating system 156, resource allocation manager 162, or other processes to obtain resource utilization profiles for the currently executing code 160, and may determine an amount of unused memory 224 that the code(s) 160 will require during further execution. In further embodiments, the resource allocation manager 162, operating system 156, a combination thereof, or another process may schedule execution of the balloon process 168 based on a resource utilization profile. For example, the resource utilization profile may include a utilization "spike" (e.g., a time period during which a large amount of a computing resource is utilized) during a first phase of executing the code 160, followed by a second phase in which less of the computing resource is utilized. The resource allocation manager 162 may therefore initially allocate a large quantity of the computing resource to the virtual machine instance 154, and then schedule the balloon process 168 to execute after the first phase of executing the user-submitted code 160. In other embodiments, as described in more detail below, the resource allocation manager 162 may schedule execution of the balloon process 168 based on the availability of other computing resources, such as processor time or communications bandwidth, such that execution of the balloon process 168 does not interfere with the execution of user-submitted code 160.

Figure 2C:
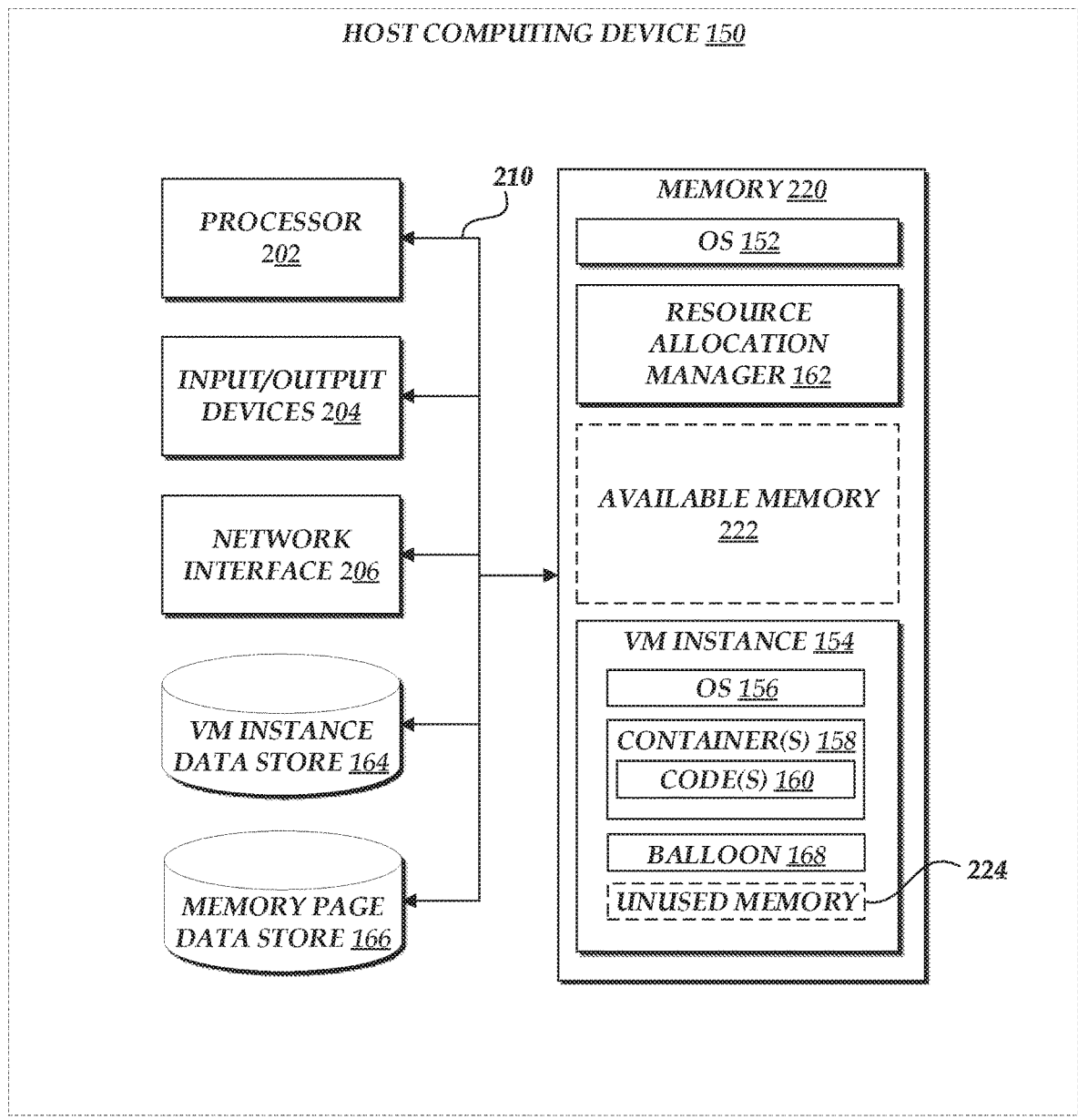

FIG. 2C depicts the general architecture of the host computing device 150 after the resource allocation manager 162 has reclaimed at least a portion of the unused memory 224 that was identified as reclaimable by the balloon process 168, and has added this reclaimed memory to the pool of available memory 222. Unless described otherwise, components illustrated in FIG. 2C are identical to those illustrated in FIG. 2A. As described in more detail below, the balloon process 168 may communicate with the resource allocation manager 162 regarding the memory that it has identified as reclaimable, and may "deflate" by releasing that memory in conjunction with the resource allocation manager 162 changing its allocation of memory to the virtual machine instance 154. For example, the resource allocation manager 162 may reduce the allocation of memory 220 to the virtual machine instance 154 by the amount of memory held by the balloon process 168, and may instruct the balloon process 168 to release the memory it is holding as the allocation of memory 220 to the virtual machine instance 154 is reduced.

In various embodiments, the resource allocation manager 162 may reclaim all or part of the unused memory 224 that the balloon process 168 identifies as reclaimable. For example, the resource allocation manager 162 may determine that the amount of memory 220 allocated to the virtual machine instance 154 should not fall below a threshold, even if the balloon process 168 indicates that the virtual machine instance 154 is not currently using the threshold amount of memory. As a further example, the resource allocation manager 162 may determine that specific memory pages can be reallocated based on performance considerations, such as a consideration of whether it would be more efficient to reclaim the memory page now and restore it at a later time, or whether the resource costs associated with writing the page to a storage device and reading it from the storage device outweigh the benefits of reclaiming the page. As a still further example, the resource allocation manager 162 may obtain a forecast of user-submitted tasks that it expects to execute in the near future, and may determine an amount of memory to reclaim based on sizing the virtual machine instance 154 for the pending tasks.

Figure 2D:
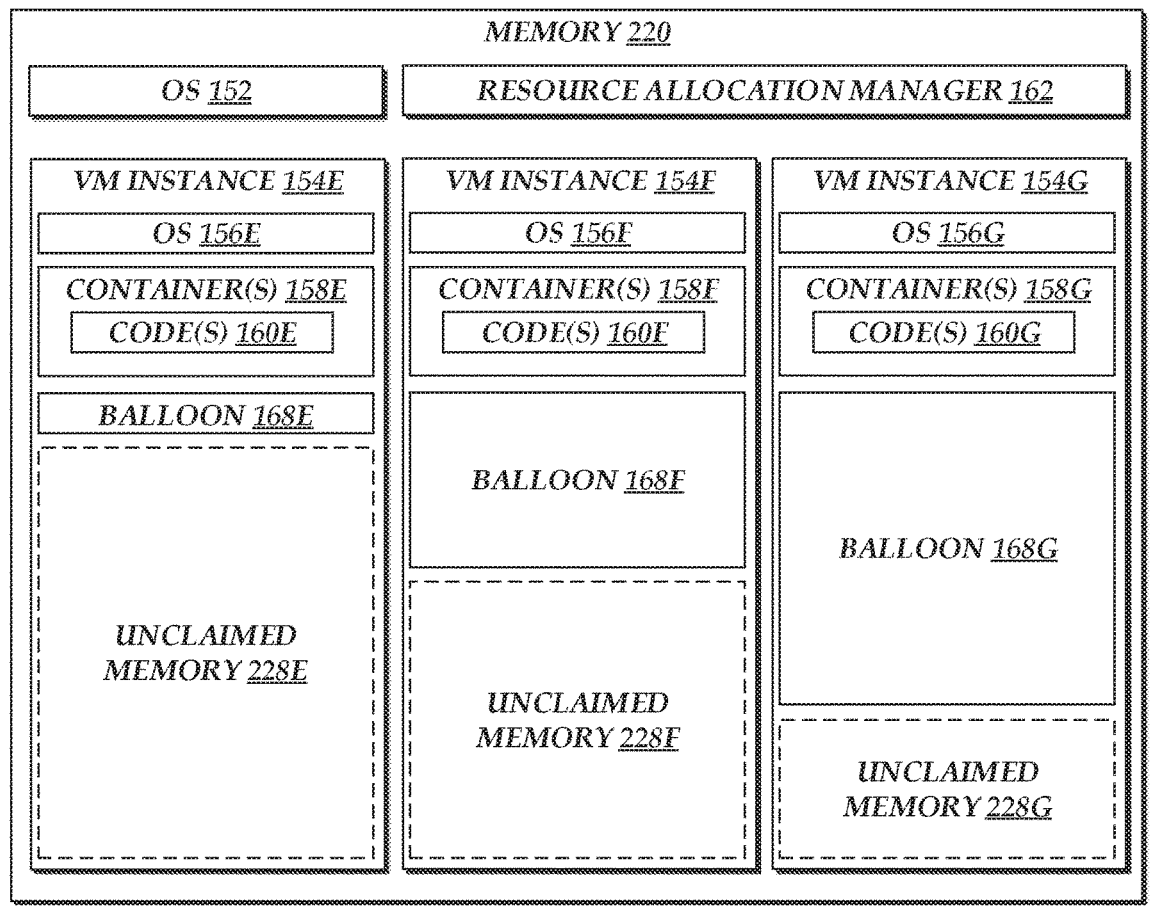

FIG. 2D depicts an embodiment of the host computing device 150 in which portions of the memory 220 and other computing resources have been allocated to a number of virtual machine instances 154E-G, and in which balloon processes 168E-G are used to dynamically configure and reconfigure the amount of unclaimed memory 230E-G in each virtual machine instance 154E-G. For clarity of illustration, components of the host computing device 150 other than the memory 220 have been omitted. In the illustrated embodiment, the virtual machine instances 154E-G each have the same amount of allocated memory 228E-G, but are presented to users as having differing amounts of unclaimed memory 230E-G by controlling the amount of memory allocated to the balloon processes 168E-G.

In some embodiments, as described in more detail below, the resource allocation manager 162 may use the balloon processes 168E-G to simplify provisioning of virtual machine instances 154E-G. For example, the resource allocation manager 162 may provision and configure a pool of virtual machine instances 154E-G with identical computing resources prior to receiving requests to execute user-submitted tasks, and then inflate the balloon processes 168E-G to reclaim over-allocated resources once the actual resource needs for a particular task can be determined. In some embodiments, the resource allocation manager 162 may provision and configure the virtual machine instances 154E and their respective operating systems 156E-G as having the specified amount of allocated memory 228E-G, but "behind the scenes" the resource allocation manager 162 may allocate only the unclaimed memory 230E unless and until additional memory is needed. The resource allocation manager 162 may thus use the balloon processes 168E-G to dynamically change the amount of memory 220 assigned to a virtual machine instance 154E-G without reprovisioning the virtual machine instance 154E-G, and may thereby avoid difficulties or challenges related to changing the computing resources of a "live" virtual machine instance 154E-G. Additionally, in some embodiments (not shown in FIG. 2D), the resource allocation manager 164 may provision a virtual machine instance with all of its assigned memory claimed by a balloon process (i.e., with no unclaimed memory), and may subsequently create unclaimed memory by releasing memory held by the balloon process.

In some embodiments, the on-demand code execution system 110 may use a reclaimable resource system to process user requests to change the allocation of computing resources to a virtual machine instance that is currently executing a user-submitted task. For example, the on-demand code execution system 110 may process a request to execute a user-submitted task on a virtual machine instance having a specified amount of memory 220. The resource allocation manager 162 may execute the code 160G associated with the task by assigning it to a virtual machine instance 154G that has an allocated memory 228G in excess of the specified amount, and then inflating the balloon process 168G until only the specified amount of user-accessible memory 230G remains. The on-demand code execution system 110 may then receive a subsequent user request to increase the amount of memory 220 allocated to the virtual machine instance 154G, and may process the subsequent request by deflating the balloon process 168G to increase the amount of user-accessible memory 230G. Similarly, the on-demand code execution system 110 may process a request to reduce the amount of memory 220 allocated to a "live" virtual machine instance 154E by inflating the balloon process 168E.

In some embodiments, the host computing device 150 may further include components other than those illustrated in FIGS. 2A, 2B, 2C, and 2D. For example, the host computing device 150 may include components for collecting and storing resource utilization metrics, which may be used to determine which resources are reclaimable. As a further example, the memory 220 may include data regarding virtual machine instances or pending tasks to be executed. As a still further example, the host computing device 150 may include a resource utilization profile data store, which may contain information regarding the resources utilized by tasks executed on any or all of the virtual machine instances 154A-G. FIGS. 2A, 2B, 2C, and 2D are thus understood to be illustrative but not limiting.

Figure 3A:
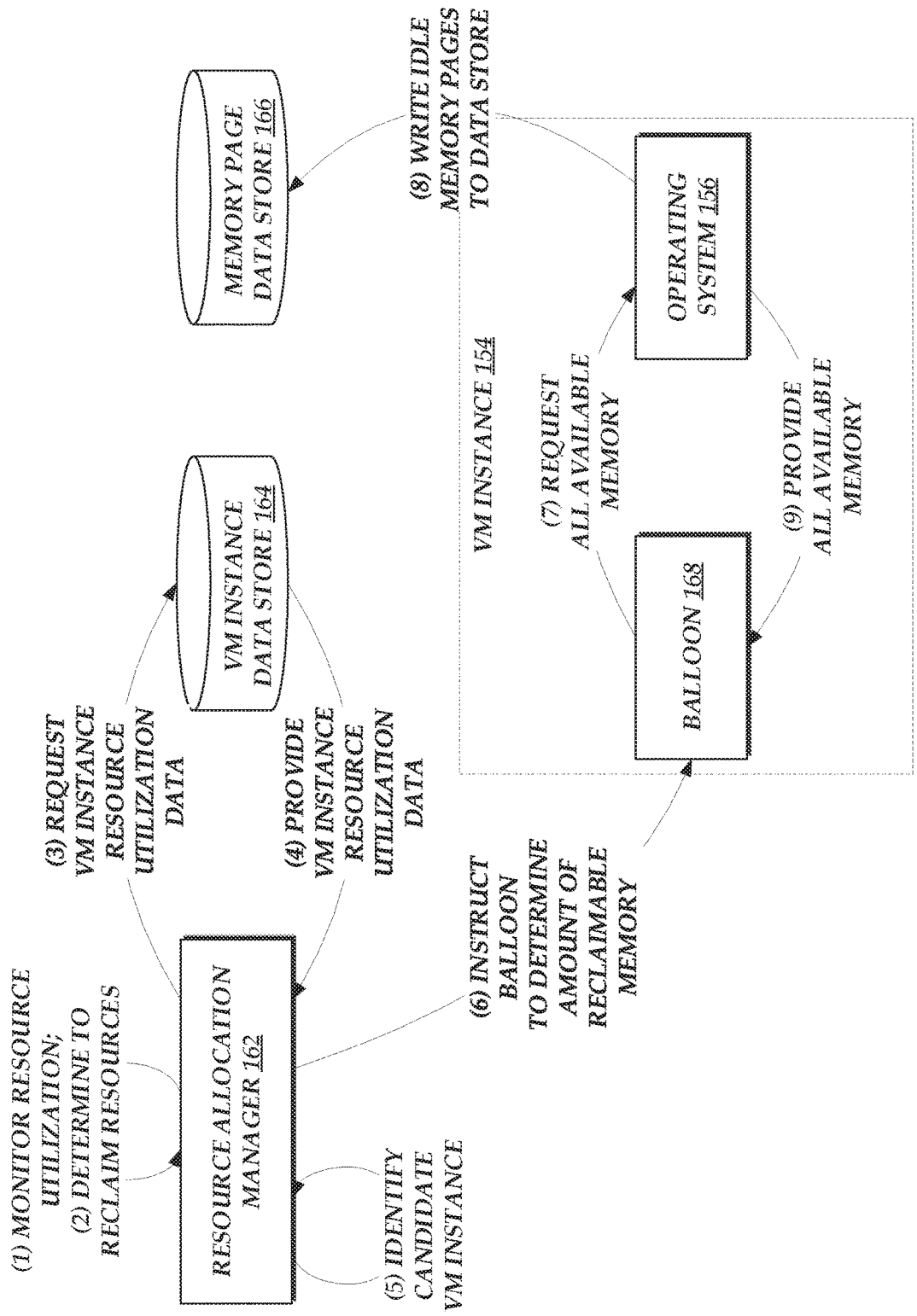

FIGS. 3A and 3B depict illustrative interactions for reclaiming computing resources in accordance with aspects of the present disclosure. As discussed above, the illustrative interactions may allow an on-demand code-execution system to make more efficient use of computing resources that would otherwise be idle or underutilized by determining that these resources can be reclaimed, reclaiming them, and allocating them to other uses (e.g., provisioning additional virtual machine instances). With reference now to FIG. 3A, at (1), a resource allocation manager 162 monitors computing resource utilization on a device such as the host computing device 150 depicted in FIGS. 2A, 2B, 2C, and 2D. Illustratively, the resource allocation manager 162 may monitor utilization of computing resources in terms of their availability to be allocated or reallocated to virtual machine instances, and may evaluate resource utilization relative to current or predicted demand for computing resources. In some embodiments, the resource allocation manager 162 may monitor utilization of computing resources to determine whether sufficient resources are available to execute a resource reclamation activity. For example, a resource reclamation activity may consume a known or predicted quantity of processing time, communications bandwidth, or other computing resources, and the resource allocation manager 162 may monitor the availability of these resources. In other embodiments, the resource allocation manager 162 may monitor computing resources indirectly. For example, the resource allocation manager 162 may monitor reads and writes to a data store, such as the memory page data store 166 depicted in FIGS. 2A, 2B, 2C, and 2D, to detect and quantify utilization of memory allocated to virtual machine instances. Additionally, in some embodiments, the resource allocation manager 162 may obtain resource utilization profiles, historical measurements of previous task executions, or other predictions of resource utilization associated with tasks executing on the host computing device 150, and may predict resource utilization based on these data.

At (2) the resource allocation manager 162 makes a determination that computing resources should be reclaimed. In various embodiments, the determination may be based on factors such as demand for computing resources, availability of computing resources to be allocated, utilization of allocated computing resources, availability of computing resources for performing a resource reclamation activity, time elapsed since a reclamation activity was last performed, and other criteria. For example, the resource allocation manager 162 may determine that the host computing device 150 does not have sufficient resources to provision an additional virtual machine instance, or that a quantity or percentage of a computing resource that is available to be allocated to virtual machine instances has fallen below a threshold. As a further example, the resource allocation manager 162 may determine that a processor on the host computing device 150 is currently idle and could be used to perform a resource reclamation activity. As a still further example, the resource allocation manager 162 may determine that memory allocated to virtual machine instances is currently underutilized based on the volume of reads and writes to a backing data store.

At (3), the resource allocation manager requests virtual machine instance resource utilization data from the virtual machine instance data store 164. In various embodiments, the virtual machine instance resource utilization data may include information regarding the number and type of virtual machine instances on the host computing device 150, the computing resources allocated to the virtual machine instances, per-instance resource utilization metrics, instantiation times, number of tasks executed, amount or percentage of idle time, resource profiles for tasks executing on the virtual machine instances, start times for tasks, estimated or actual task execution durations (e.g., based on task profiles or output received from the task), the amount of time since the virtual machine instance was instantiated, the amount of time since a task was executed on the virtual machine instance, the amount of time since a resource reclamation activity was performed on the virtual machine instance, or other data or metrics. At (4), the virtual machine instance data store 164 provides the requested resource utilization data.

At (5), the resource allocation manager 162 identifies a virtual machine instance 154 from which a computing resource may be reclaimed. Illustratively, the virtual machine instance 154 may be identified based on the virtual machine instance resource utilization data. For example, the resource allocation manager 162 may determine a weighted score for each virtual machine instance on the host computing device 150 based on factors such as the estimated amount of idle time for each instance, and may identify the virtual machine instance 154 based on the weighted score. In other embodiments, the resource allocation manager 162 may select the virtual machine instance 154 randomly, iterate through the virtual machine instances in a particular sequence (e.g., from oldest to newest, largest to smallest, etc.), or apply other criteria.

At (6), the resource allocation manager 162 instructs a resource reclamation identification process to identify an amount of a computing resource that is reclaimable. In the illustrated embodiment, the resource reclamation identification process is a balloon process 168 and the computing resource is memory. In some embodiments, the resource allocation manager 162 may instruct the virtual machine instance 154 to execute the balloon process 168 when the virtual machine instance 154 at the next time it is not otherwise occupied (e.g., when it has completed execution of a user-submitted task). In other embodiments, the resource allocation manager 162 may instruct the virtual machine instance to execute the balloon process 168 in parallel with a user-submitted task. In some embodiments, the resource allocation manager 162 may communicate with the balloon process 168 via an application programming interface ("API") call or other protocol that allows the resource allocation manager 162 to invoke the balloon process 168. In other embodiments, the balloon process 168 (or instructions to invoke the balloon process 168) may be sent to the virtual machine instance 154 via the protocol used to assign user-submitted tasks to the virtual machine instance 154 (e.g., via a worker manager 140).

In some embodiments, the resource allocation manager 162 may determine schedules, triggers, or other criteria for invoking execution of the balloon process 168, and may transmit these criteria to the virtual machine instance 154 rather than directly invoking the balloon process 168. For example, the resource allocation manager 162 may instruct the virtual machine instance to execute the balloon process 168 upon completion of any user-submitted task, after a specified number of tasks have been executed, after a task meeting certain criteria has been completed, while a task meeting certain criteria is in progress, and so forth.

At (7), the balloon process 168 may "inflate" by requesting that the operating system 156 of the virtual machine instance 164 allocate memory to the balloon process 168. In some embodiments the interactions at (7), (8), and (9) may be carried out repeatedly, and the balloon process 168 may iteratively request memory pages from the operating system 156 until a criterion is satisfied. For example, the balloon process may determine a threshold amount of memory to identify as reclaimable, and request memory pages until the threshold is satisfied. In other embodiments, the balloon process 168 may request memory pages until the operating system 156 runs out of memory to allocate.

At (8), in some embodiments, the operating system 156 may write disk-backed memory pages to the memory page data store 166 in order to free up memory pages to be allocated to the balloon process 168. In some embodiments, the balloon process 168 or the operating system 156 may determine whether disk-backed memory pages should be written to the memory page data store 166 or whether doing so would be inefficient. For example, the balloon process 168 may determine that a memory page will not be accessed for a threshold period of time, and that reclaiming the memory page is therefore preferable. As a further example, the balloon process 168 or the operating system 156 may determine that the memory page will be accessed within the threshold period of time, and that keeping the page in memory rather than reloading it from disk would be more efficient. In various embodiments, the balloon process 168 or the operating system 156 may apply different criteria (e.g., time between reads or writes to the memory page, time required to re-load the memory page, etc.) to determine whether a memory page should be offloaded to the memory page data store 166. At (9), the operating system 156 provides the memory page(s) to the balloon process 168.

With reference now to FIG. 3B, at (10), the balloon process 168 reports the amount of memory it was able to obtain to the resource allocation manager 162. In some embodiments, as described above, the balloon process 168 may release a quantity of memory pages as a buffer against the virtual machine instance 154 running out of memory, and may thus report less than the total amount of memory it was able to obtain. In other embodiments, the balloon process 168 may report the total amount of memory it was able to obtain, and the resource allocation manager 162 may determine whether and in what amount to allocate a buffer.

At (11), the resource allocation manager 162 determines the amount of memory to reclaim from the virtual machine instance 154. In some embodiments, the resource allocation manager 162 may reclaim all of the memory that was identified as reclaimable by the balloon process 168. In other embodiments, the resource allocation manager 162 may reclaim a portion of the amount of memory identified as reclaimable. For example, as described above, the resource allocation manager 162 may leave a fixed amount or percentage of memory as a buffer against the virtual machine instance 154 running out of memory during execution of a task. As further examples, the resource allocation manager 162 may determine the amount of memory to reclaim based on resource utilization profiles for currently executing tasks, resource utilization profiles for tasks the virtual machine instance 154 is predicted to execute, historical resource utilization metrics, metrics collected during execution of the balloon process 168 (e.g., a number of memory pages written to the memory page data store 166, performance or utilization metrics for a currently executing task, etc.), or other criteria. At (12), the resource allocation manager 162 reclaims the determined amount of memory and returns it to the pool of available computing resources.

At (13), in some embodiments, the resource allocation manager 162 informs the balloon process 168 of the amount of memory that was reclaimed. Illustratively, the balloon process 168 may effectively "hide" the reclamation of memory that was assigned to the virtual machine instance 154, and may thereby reduce or eliminate any need to reprovision or reconfigure the virtual machine instance 154 when the amount of memory allocated to it is reduced. For example, the virtual machine instance 154 and/or the operating system 156 may continue to operate as though the reclaimed quantity of memory was still allocated to the virtual machine instance 154 and was merely assigned to the balloon process 168. The balloon process 168 may therefore, at (14), continue to hold the reclaimed memory for as long as is needed to maintain the facade. In further embodiments, at (15), the balloon process 168 may release any memory that was identified as reclaimable and not reclaimed, and thereby return this quantity of memory to the operating system 156 for assignment to other processes (e.g., execution of user-submitted code 160). In other embodiments, the resource allocation manager 162 may inform the operating system 156 of the amount of memory reclaimed, and the balloon process 168 may release all of the memory it identified as reclaimable so that the operating system 156 can turn over the reclaimed amount of memory to the resource allocation manager 162.

At (16), the resource allocation manager 162 transmits updated virtual machine instance data to the virtual machine instance data store 164. The updated virtual machine instance data may include, for example, updated information regarding the amount of memory assigned to the virtual machine instance 154, the time at which a reclamation process was most recently executed on the virtual machine instance 154, resource utilization metrics, and the like. In some embodiments, the resource allocation manager 162 may generate or update computing resource utilization profiles for tasks executed on the virtual machine instance 154, and may transmit these profiles to the virtual machine instance data store 164 or another data store.

It will be understood that FIGS. 3A and 3B are provided for purposes of example, and that many variations on the depicted interactions are within the scope of the present disclosure. For example, the interaction at (16) in FIG. 3B may be carried out prior to or in parallel with the interactions at (13), (14), or (15). As a further example, as described above, the interaction at (11) may be carried out by the balloon process 168. FIGS. 3A and 3B are thus understood to be illustrative and not limiting.

Figure 4:
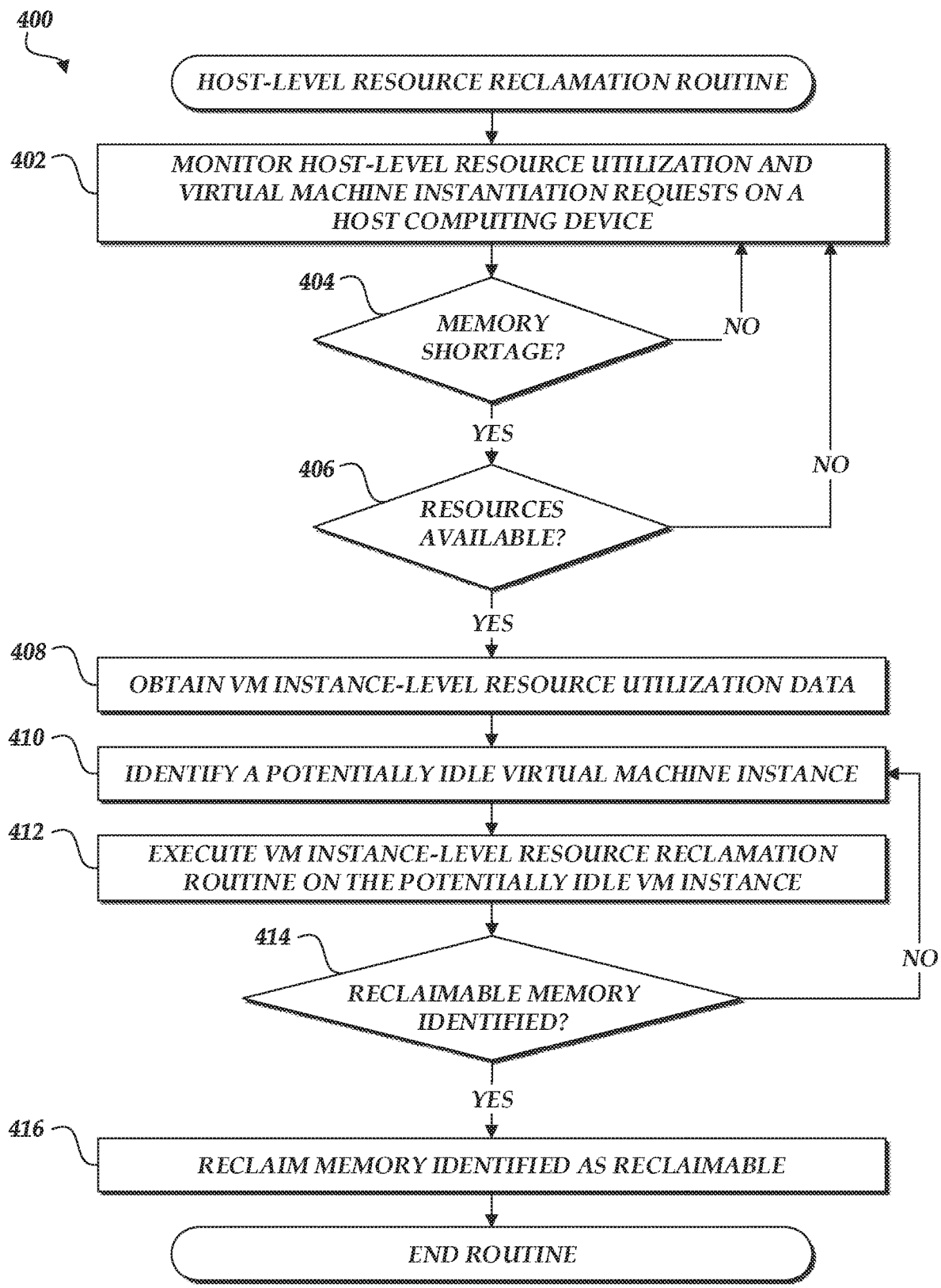
FIG. 4 is a flow chart depicting an illustrative routine for reclaiming computing resources from virtual machine instances in accordance with aspects of the present disclosure.

FIG. 4 is a flow diagram of an illustrative routine 400 for reclaiming computing resources at the level of a host computing device. The routine 400 may be carried out, for example, by the resource allocation manager 162 depicted in FIG. 2A. The routine 400 begins at block 402, where utilization of computing resources and demand for computing resources on a host computing device may be monitored. Illustratively, utilization and demand may be monitored in terms of quantities or percentages of resources consumed by, or allocated to, virtual machine instances on the host computing device. For example, utilization of a processor may be monitored to identify virtual machine instances whose consumption of processor time is below a threshold. In some embodiments, resource utilization profiles for user-submitted tasks may be used to predict demand for computing resources.

At decision block 404, a determination may be made as to whether a computing resource (e.g., memory) needs to be reclaimed. For example, the determination may be that the quantity of memory available to be allocated to new or existing virtual machine instances has fallen below a threshold, is insufficient to meet projected demand, or otherwise does not satisfy a criterion. In some embodiments, block 402 and decision block 404 may be omitted and the routine 400 may be carried out in accordance with a schedule (e.g., nightly or hourly). If the determination at decision block 404 is that the quantity of available memory satisfied the applied criteria, then the routine 400 branches to block 402 and continues monitoring the utilization of computing resources.

If the determination at decision block 404 is that a computing resource needs to be reclaimed, then at decision block 406 a determination may be made as to whether sufficient computing resources are available to carry out a reclamation activity (e.g., the remaining blocks of the routine 400). For example, further execution of the routine 400 may require processor time, memory, bandwidth, and the like, and a determination may be made as to whether sufficient quantities of these resources will be available or whether utilizing these resources would interfere with execution of user-submitted tasks. If the determination at decision block 404 is that insufficient quantities of resources are (or will be) available to carry out a reclamation activity, then the routine 402 returns to block 402 and continues monitoring computing resources. In some embodiments, decision block 406 may be carried out iteratively until sufficient resources are available.

If the determination at decision block 406 is that sufficient computing resources are available to carry out a reclamation activity, then the routine 400 branches to block 408, where resource utilization data for individual virtual machine instances may be obtained. Illustratively, resource utilization data may include amounts of processor time consumed, volumes of reads and writes to storage media, amounts of disk-backed memory read or written, and the like. In some embodiments, resource utilization profiles may be obtained for tasks executing on individual virtual machine instances, and may be used to estimate current or future resource utilization.

At block 410, a virtual machine instance is identified as a potential holder of computing resources that could be reclaimed. Illustratively, the virtual machine instance may be identified based on criteria such as consumption of computing resources, utilization of computing resources relative to the quantity of computing resources allocated to the virtual machine instances, and so forth. In some embodiments, block 408 may be omitted and a virtual machine instance may be identified at block 410 based on criteria other than resource utilization data. For example, the virtual machine instance may be selected randomly, selected on a round-robin or periodic basis, identified based on the amount of time since a reclamation process was last executed on the virtual machine instance, and so forth.

At block 412, a resource reclamation routine (e.g., the routine 500 described in more detail with reference to FIG. 5 below) may be carried out on the identified virtual machine instance. Illustratively, the resource reclamation routine may identify all or part of a resource assigned to the virtual machine instance as reclaimable, based on factors such as the resource reclamation routine's ability to request and receive the resource, utilization of the resource, whether the virtual machine instance has completed execution of a user-submitted task, and the like. The resource reclamation routine may thus provide information regarding resource utilization by the virtual machine instance that would otherwise not be externally available, and may do so in a manner that does not interfere with task execution on the virtual machine instance.

At decision block 414, a determination may be made as to whether the resource reclamation routine identified a reclaimable quantity of the computing resource. As described in more detail below, the resource reclamation routine may report an amount of memory or other computing resource that it was able to obtain without disrupting other tasks executing on the virtual machine instance. In some embodiments, a determination may be made as to whether or how much of the reclaimable quantity of the computing resource should be reclaimed. For example, as described above, the determination may be that a portion of the reclaimable quantity should be retained by the virtual machine instance as a buffer.

In some embodiments, the routine 400 may determine a quantity of memory that needs to be reclaimed in order to meet current or pending resource demands, and the determination at decision block 414 may be as to whether the quantity of memory that can be reclaimed from this virtual machine instance is sufficient to meet the demand. If not, then the routine 400 may branch to block 410, identify another virtual machine instance, and iterate until a sufficient quantity of the computing resource is identified as reclaimable.

If a reclaimable quantity of the computing resource is identified (or, in some embodiments, if and when a sufficient reclaimable quantity of the computing resource is identified), then the routine 400 branches to block 416, where the identified quantity of the computing resource is reclaimed. In some embodiments, as described in more detail above, the computing resource may be reclaimed by indicating to the resource reclamation process that it should retain all or part of the memory it has identified as reclaimable, and then deallocating that quantity of the computing resource from the virtual machine instance. In other embodiments, the routine 400 may reprovision the virtual machine instance to change the amount of the computing resource that is allocated to it.

It will be understood that FIG. 4 is provided for purposes of example, and that many variations on the depicted interactions are within the scope of the present disclosure. For example, decision blocks 404 and 406 may be carried out in either order or in parallel. As a further example, block 408 may be carried out at any time prior to block 410. As a still further example, as described above, decision block 404 may be omitted and the routine 400 may be carried out periodically or in response to various criteria being satisfied. FIG. 5 is thus understood to be illustrative and not limiting.

Figure 5:
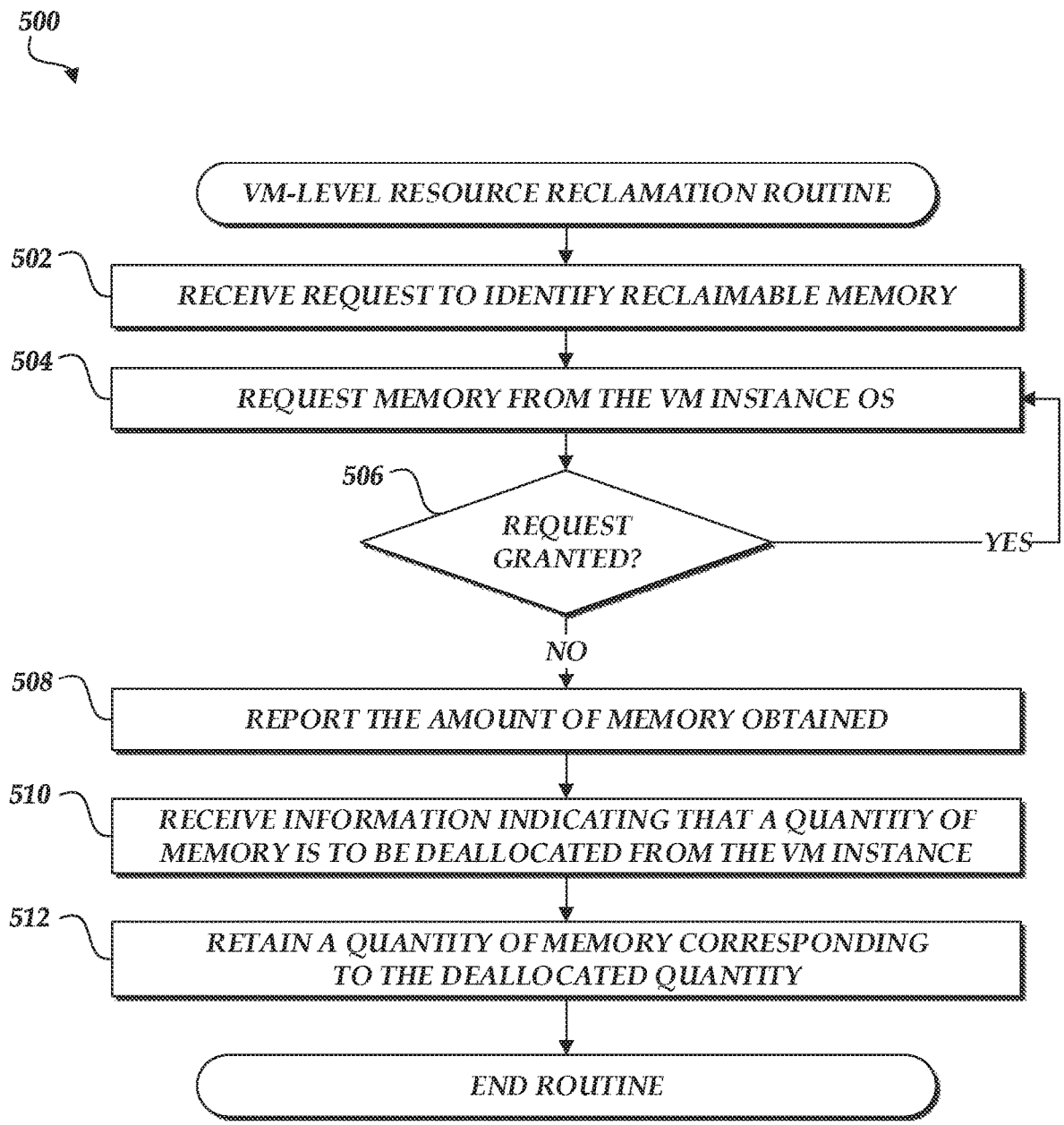
FIG. 5 is a flow chart depicting an illustrative routine for determining the amount of resources that can be reclaimed from a virtual machine instance in accordance with aspects of the present disclosure.

FIG. 5 is a flow diagram of an illustrative resource reclamation routine 500 that implements aspects of the present disclosure. The routine 500 may be carried out within a virtual machine instance executing on a host computing device, for example, by the balloon process 168 depicted in FIG. 2A. The routine 500 begins at block 502 where a request to identify reclaimable memory may be obtained. Illustratively, the request may be obtained from a host-level routine such as the routine 400 depicted in FIG. 4. In some embodiments, block 502 may be omitted and the routine 500 may be carried out in response to an event other than a request. For example, the routine 500 may be carried out in response to detecting that the virtual machine instance has completed execution of a user-submitted task.

At block 504, a block of virtual memory may be requested from the operating system of the virtual machine instance. In various embodiments, the block of virtual memory may be of a fixed size (e.g., corresponding to a number of memory pages) or may vary in size based on factors such as the amount of memory allocated to the virtual machine instance, the success or failure of a previous attempt to request memory, or other criteria. In some embodiments, the amount of memory initially requested may be based on a resource utilization profile associated with a task executing on the virtual machine instance.

At decision block 506, a determination may be made as to whether the request for memory was granted. If so, then the routine 500 returns to block 504 and repeats the request. If not, then the routine 500 branches to block 508. In some embodiments, the routine 500 may increase or decrease the size of the next request based on whether the previous request was granted, and may only proceed to block 508 after a request for a threshold quantity of memory is denied. For example, the routine 500 may initially request a specified number of memory pages, increase the size of subsequent requests geometrically or exponentially until a request is denied, and then decrease the size of requests until a request for the specified number of memory pages is denied.

At block 508, the quantity of memory that was obtained may be reported to the sender of the request (or, in some embodiments, to a hypervisor or other process executing on the host computing device) as potentially reclaimable. In some embodiments, as described above, a percentage or portion of the memory obtained by the routine 500 may be set aside as a buffer to prevent the virtual machine instance from running out of memory. In other embodiments, the total quantity of memory that was obtained may be identified as reclaimable.

At block 510, in some embodiments, information may be received indicating that a quantity of memory has been or is being deallocated from the virtual machine instance. For example, the routine 500 may report that it obtained ten memory pages, and may receive an indication that eight of the memory pages are being deallocated. At block 512, the memory pages that are being deallocated may be retained by the routine 500 to prevent the virtual machine instance from further trying to access or assign them. The routine 500 may thus obviate the need to reprovision or reconfigure the virtual machine instance to have a different quantity of allocated memory, since the memory that was deallocated appears within the virtual machine instance to still be assigned to the routine 500. In some embodiments, however, the virtual machine instance may be reprovisioned with a new memory size and the operating system or another component of the virtual machine instance may coordinate with the routine 500 to release the deallocated memory.

It will be understood that FIG. 5 is provided for purposes of example, and that many variations on the depicted interactions are within the scope of the present disclosure. For example, the routine 500 may release part of all of the memory that was requested at block 504 (e.g., if the routine 500 identified ten memory pages as reclaimable and the system then reclaimed eight memory pages, the routine 500 may release the remaining two). As a further example, block 502 may be omitted and the routine 500 may proactively report that a quantity of memory is reclaimable. FIG. 5 is thus understood to be illustrative and not limiting.

Figure 6:
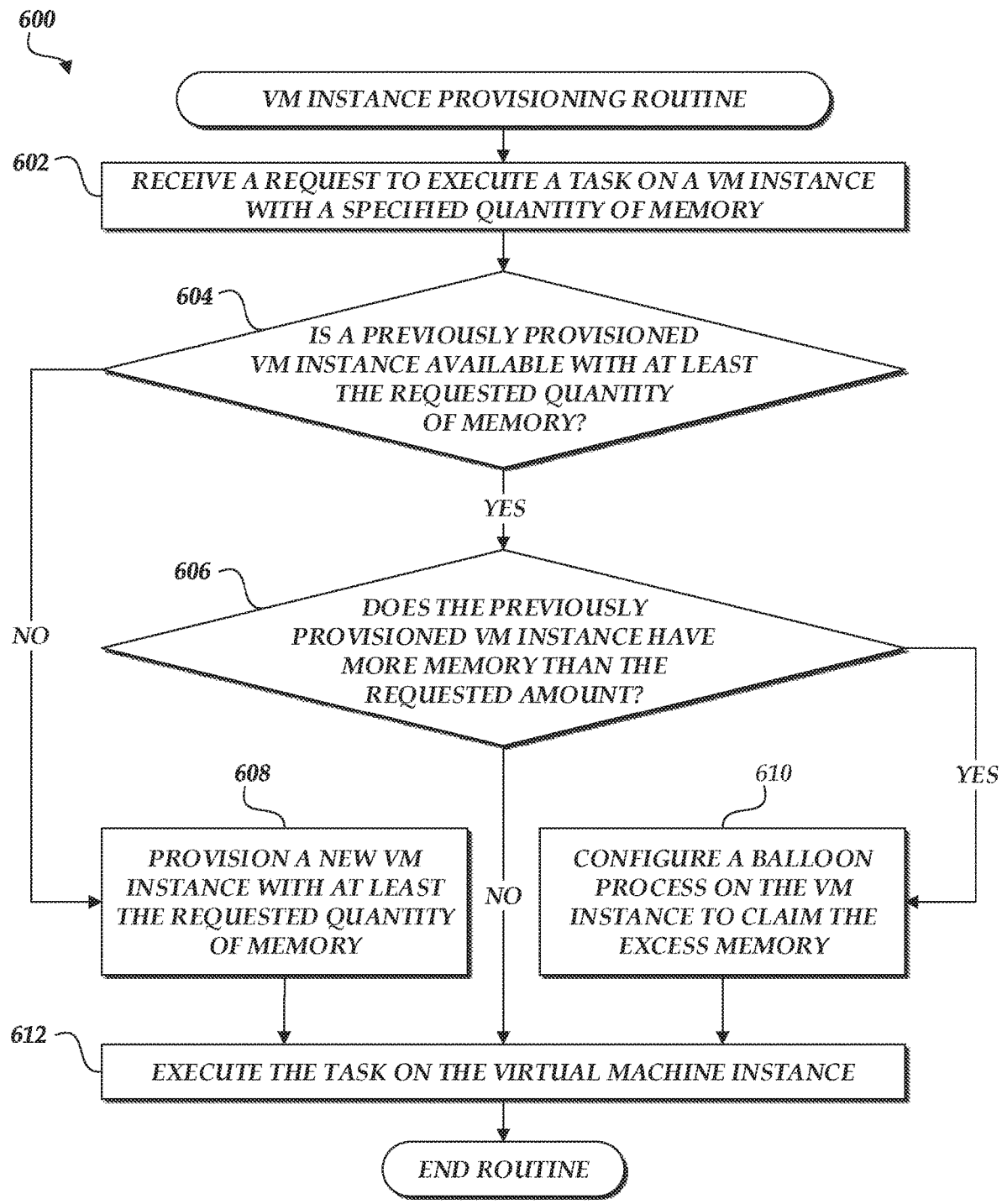
FIG. 6 is a flow chart depicting an illustrative routine for provisioning virtual machine instances that make varying amounts of computing resources available in accordance with aspects of the present disclosure.

FIG. 6 is a flow diagram of a virtual machine instance provisioning routine 600 that implements aspects of the present disclosure. The virtual machine instance provisioning routine 600 may be carried out, for example, by the resource allocation manager 162 depicted in FIGS. 2A, 2B, and 2C. The routine 600 begins at block 602, where a request may be received to execute a task on a virtual machine instance having a specified quantity of a computing resource. Illustratively, an on-demand code execution system may allow a user to select (e.g., via the frontend 120 depicted in FIG. 1) a configuration for the virtual machine instance that will execute a particular task. A user may therefore request a virtual machine instance having sufficient computing resources to execute the requested task, but avoid wasting resources or incurring unnecessary costs by requesting more resources than are needed. The request may, for example, specify that execution of the requested task is to occur on a virtual machine instance having 768 megabytes ("MB") of memory.

At decision block 604, a determination is made as to whether an existing virtual machine instance having at least the requested quantity of the computing resource is available to execute the task. Illustratively, the routine 600 may be carried out on a host computing device (e.g., the host computing device 150) that is hosting a number of virtual machine instances, each of which may have a quantity of computing resources allocated to it and may be available depending on whether it is current executing another task. If the determination at decision block 604 is that no existing virtual machine instance with the requested quantity of the computing resource is available, then at block 608, in some embodiments, a new virtual machine instance may be provisioned with at least the requested quantity of the computing resource. In other embodiments, the routine 600 may determine whether sufficient computing resources are available to provision a new virtual machine instance and/or may report that the host computing device is unable to fulfill the request to execute the task.

If the determination at decision block 604 is that a virtual machine instance is available with at least the requested quantity of memory, then at decision block 606 that determination is made as to whether the virtual machine instance has more than the requested quantity of memory. For example, the available virtual machine instance may have 1024 MB of memory, and the determination may be that the instance has more than the requested quantity of 768 MB. If so, then at block 610 a balloon process may be configured on the virtual machine instance to reclaim the excess quantity of memory. To continue the previous example, the balloon process may be configured to reclaim 256 MB of the 1024 MB that are allocated to the virtual machine instance, thereby leaving the instance with 768 MB and effectively resizing its memory allocation to comply with the request. Inflating or deflating the balloon process may therefore improve the speed and efficiency of the on-demand code execution system relative to the time and resources consumed in provisioning a new virtual machine instance with exactly the right quantity of memory.

If the determination at block 606 is that the available virtual machine instance has exactly the requested quantity of memory, or after provisioning a new virtual machine instance at block 608 or configuring the balloon process to leave the virtual machine instance with the requested quantity at block 610, the routine 600 continues at block 612, where the request may be fulfilled by executing the task on the virtual machine instance.

It will be understood that FIG. 6 is provided for purposes of example, and that many variations on the depicted interactions are within the scope of the present disclosure. For example, virtual machine instances on the host computing device may always be provisioned with the maximum quantity of memory that a user can request, and blocks 604, 606, and 610 may be consolidated into a determination of whether a virtual machine instance is available and then configuring the balloon process to reclaim or release the appropriate quantity of memory. As a further example, the routine 600 may receive a request for a virtual machine instance having a particular configuration (e.g., a particular quantity of a computing resource) rather than receiving a request to execute a task, and may thus provide the requested virtual machine instance at block 612 rather than executing the task. FIG. 6 is thus understood to be illustrative and not limiting.

Figure 7:
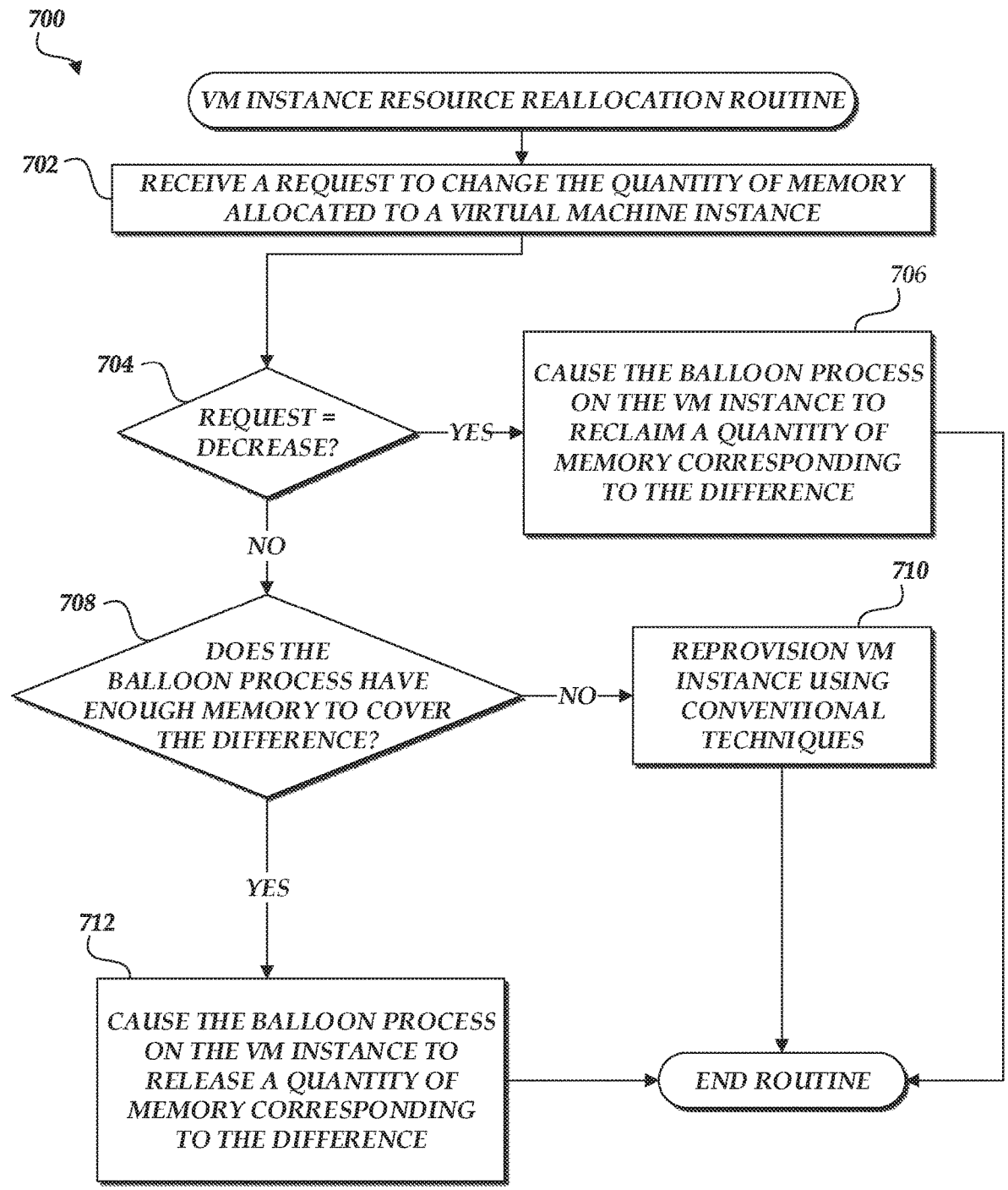
FIG. 7 is a flow chart depicting an illustrative routine for reallocating computing resources assigned to a virtual machine instance in accordance with aspects of the present disclosure.

FIG. 7 is a flow diagram of a virtual machine instance resource reallocation routine 700 that implements aspects of the present disclosure. The virtual machine instance provisioning routine 700 may be carried out, for example, by the resource allocation manager 162 and the balloon process 168 depicted in FIGS. 2A, 2B, and 2C. The routine 700 begins at block 702, where a request may be received to change the quantity of a computing resource that is allocated to a virtual machine instance. For example, a virtual machine instance may have 1536 MB of memory allocated to it, and the request may be to lower its allocation to 1024 MB. In some embodiments, the request may be to increase or decrease the allocation by a specified quantity (e.g., 512 MB) rather than a request to change the allocation to a specified value. Additionally, in some embodiments, a virtual machine instance may have been initially provisioned with a higher quantity of memory (e.g., 2048 MB), and then a computing resource reclamation process may have reclaimed a portion of the original allocation (e.g., a balloon process may have "inflated" to reclaim 512 MB). It may thus be possible to increase or decrease the amount of memory allocated to the virtual machine instance by adjusting the quantity of memory reclaimed by the balloon process.

At decision block 704, a determination may be made as to whether the request is to decrease the quantity of the computing resource. Since the balloon process can be inflated to reclaim all available memory if need be, a request to decrease the quantity of the computing resource can generally be satisfied by (further) inflating the balloon process. If the determination at decision block 704 is that the request is to decrease the quantity, then at block 706 the request may be fulfilled by causing the balloon process to inflate by the necessary amount, after which the routine 700 ends.

If the determination at decision block 704 is instead that the request is to increase the quantity of memory allocated to the virtual machine instance, then at decision block 708 a determination is made as to whether the balloon process has previously reclaimed enough memory to cover the requested increase. To continue the previous example, the virtual machine instance may have been initially provisioned with 2048 MB and the balloon process may have reclaimed 512 MB, leaving the virtual machine instance with 1536 MB. If the request is to change the quantity of memory allocated to the virtual machine instance to, e.g., 1792 MB, then the request can be fulfilled by deflating the balloon process. If the determination at decision block 708 is that the request cannot be fulfilled by deflating the balloon process, then at block 710 the request may be fulfilled using conventional techniques (e.g., by reprovisioning the virtual machine instance with a larger quantity of memory). If the determination at decision block 708 is instead that the request can be fulfilled by deflating the balloon process, then at block 712 the request is fulfilled by causing the balloon process to release the appropriate quantity of memory. In some embodiments, the routine 700 may further allocate additional memory (e.g., from a resource pool on a host computing device) corresponding to the quantity of memory released by the balloon process.

It will be understood that FIG. 7 is provided for purposes of example, and that many variations on the depicted interactions are within the scope of the present disclosure. For example, block 710 may be omitted and the routine 700 may instead report that it was unable to fulfill the request by invoking a memory reclamation process. As a further example, the routine 700 may be triggered by an event (e.g., a user-submitted task completing its execution) rather than receiving a request to change the allocation of memory. FIG. 7 is thus understood to be illustrative and not limiting.

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for provisioning virtual machine instances in an on-demand code execution system, the system comprising:
   a data store configured to store computer-executable instructions; and
   a processor in communication with the data store, wherein the computer-executable instructions, when executed by the processor, configure the processor to perform operations including:
      provisioning a first virtual machine instance to execute tasks on demand, wherein provisioning the first virtual machine instance includes:
         allocating a first quantity of memory to the first virtual machine instance; and
         configuring a memory reclamation process to execute within the first virtual machine instance;
      receiving a task execution request, wherein the task execution request specifies that a task is to be executed on a virtual machine instance having a second quantity of memory that differs from the first quantity;
      causing the memory reclamation process to reclaim a portion of the first quantity of memory, wherein the portion corresponds to a difference between the first quantity and the second quantity; and
      causing the first virtual machine instance to execute the task.

2. The system of claim 1 comprising further computer-executable instructions that, when executed by the processor, configure the processor to perform operations including:
   receiving a virtual machine instance reconfiguration request, wherein the virtual machine instance reconfiguration request includes configuring the first virtual machine instance to have a third quantity of memory that differs from the second quantity; and
   causing the memory reclamation process to reclaim or release a second portion of the first quantity of memory, wherein the second portion corresponds to a difference between the second quantity and the third quantity.

3. The system of claim 2, wherein the virtual machine instance reconfiguration request is received during execution of the task, and wherein the memory reclamation process reclaims or releases the second portion of the first quantity of memory during execution of the task.

4. The system of claim 1, wherein the memory reclamation process comprises a balloon process.

5. A computer-implemented method comprising:
   as implemented by one or more computing devices configured with specific computer-executable instructions,
      provisioning a first virtual machine instance, wherein the first virtual machine instance includes an allocated quantity of a computing resource and a computing resource reclamation process configured to execute within the first virtual machine instance;
      receiving a first request to execute a task, the first request specifying execution of the task on a virtual machine instance having a requested quantity of the computing resource;
      causing the computing resource reclamation process to reclaim or release a quantity of the computing resource corresponding to a difference between the allocated quantity of the computing resource and the requested quantity of the computing resource; and
      causing the first virtual machine instance to execute the task.

6. The computer-implemented method of claim 5, wherein provisioning the first virtual machine instance includes causing the computing resource reclamation process to reclaim at least a portion of the allocated quantity of the computing resource.

7. The computer-implemented method of claim 5, wherein the computing resource comprises one or more of memory, processors, processing time, data stores, or bandwidth.

8. The computer-implemented method of claim 5 further comprising selecting the first virtual machine instance from a plurality of virtual machine instances based at least in part on a determination that the requested quantity of the computing resource is not greater than the allocated quantity of the computing resource for the first virtual machine instance.

9. The computer-implemented method of claim 5, wherein provisioning the first virtual machine instance includes allocating the allocated quantity of the computing resource.

10. The computer-implemented method of claim 5 further comprising reducing the allocated quantity of the computing resource by at least a portion of the difference.

11. The computer-implemented method of claim 10, wherein reducing the allocated quantity of the computing resource comprises reducing the allocated quantity without reprovisioning the first virtual machine instance.

12. The computer-implemented method of claim 10 further comprising:
   receiving a second request to increase the requested quantity of the computing resource; and
   in response to the second request:
      increasing the allocated quantity of the computing resource; and
      causing the computing resource reclamation process to release a quantity of the computing resource corresponding to the second request.

13. The computer-implemented method of claim 5 further comprising:
   receiving a second request to decrease the requested quantity of the computing resource; and
   in response to the second request, causing the computing resource reclamation process to reclaim a quantity of the computing resource corresponding to the second request.

14. The computer-implemented method of claim 5 further comprising:
   determining that the first virtual machine instance has finished executing the task;
   causing the computing resource reclamation process to reclaim at least a portion of the allocated quantity of the computing resource.

15. The computer-implemented method of claim 5, wherein the allocated quantity of the computing resource corresponds to at least a portion of an available quantity of the computing resource on a host computing device.

16. The computer-implemented method of claim 5, wherein causing the computing resource reclamation process to reclaim the quantity of the computing resource comprises reducing the allocated quantity of the computing resource.

17. A system comprising:
   a data store configured to store computer-executable instructions; and
   a processor in communication with the data store, wherein the computer-executable instructions, when executed by the processor, configure the processor to perform operations including:

receiving a first request to execute a task on a virtual machine instance having a requested quantity of a computing resource;

identifying, from a plurality of virtual machine instances, a first virtual machine instance having at least the requested quantity of the computing resource;

causing a computing resource reclamation process on the first virtual machine instance to reclaim or release a quantity of the computing resource on the first virtual machine instance, the quantity corresponding to a difference between the requested quantity and an unclaimed quantity of the computing resource on the first virtual machine instance; and causing the first virtual machine instance to execute the task.

18. The system of claim 17, wherein the first virtual machine instance is provisioned with an unclaimed quantity of zero, and wherein the computing resource reclamation process on the first virtual machine instance is provisioned with a claimed quantity of the computing resource corresponding to an allocated quantity for the first virtual machine instance.

19. The system of claim 18, wherein causing the computing resource reclamation process on the first virtual machine instance to reclaim or release the quantity of the computing resource comprises:

causing the computing resource reclamation process to release the requested quantity of the computing resource.

20. The system of claim 19, wherein causing the computing resource reclamation process to release the requested quantity of the computing resource includes allocating the requested quantity of the computing resource to the first virtual machine instance from a resource pool on a host computing device.

* * * * *